March 18, 1969 P. CHOFFART 3,433,885

TIGHT COVER FOR A SEMICONDUCTOR DEVICE

Filed Dec. 2, 1966

1

3,433,885
TIGHT COVER FOR A SEMICONDUCTOR DEVICE
Pierre Choffart, Massy, France, assignor to Compagnie Generale d'Electricite, Paris, France
Filed Dec. 2, 1966, Ser. No. 598,746
Claims priority, application France, Dec. 3, 1965, 40,883
U.S. Cl. 174—52 8 Claims
Int. Cl. H05k 5/02, 5/06

ABSTRACT OF THE DISCLOSURE

The present disclosure relates to a vacuum tight cover for a semiconductor device wherein said cover is provided with coaxial type control terminals which assure a rapid union of the control terminal with the control source, as well as the shielding of this connection to avoid premature starting of the device.

*Background of the invention*

The present invention relates to an improved cover for semi-conductor devices which provides means for enclosing, in a vacuum-type fashion, a semiconductor device including a principal electrode and at least one auxiliary electrode.

In a semiconductor device having several zones of alternating types of conduction, each zone forms with the adjacent zone or zones a junction or meeting point of the p-n type. Contacts are established on two or more zones so as to join thereto current inflow or supply electrodes. When considering power devices, the electrodes being utilized by the principal current which flows in the device are either welded or brazed thereto by means of counter electrodes from refractory metals, such as for example, molybdenum or tungsten.

The control electrodes, if present, are generally welded or brazed directly to the semiconductor material of the device. In the course of the operation, the semiconductor device becomes heated under the effect of the calories being freed by the Joule effect. For the purpose of keeping its temperature within specific limits, the device is generally mounted on a metallic base composed of a metal which is a good conductor of heat and electricity. This base is cooled by being mounted, for example, on a radiator which may or may not be ventilated.

In order to protect the semiconductor device from any possible pollution by the surrounding air, a cover or cap containing one or several terminals is secured to the base in such a manner as to enclose the device in a vacuum tight envelope. The terminals of the cover are coupled or joined, on the one hand, to the connections terminating in the device, and on the other hand, to the sources of electrical current necessary to supply the device. When the semiconductor device contains one or several control electrodes, they can be connected to one or to several terminals of the cover as well as the principal current supply electrode. In this case, the terminals of the cover must be insulated with respect to each other, as well as with respect to the base, in order to avoid short-circuiting of the current source or connecting two sources of current with each other. The connections of the semiconductor device ending at the terminals of the cover must be attached to the cover so as to obtain a perfect vacuum-tightness. Moreover, in the case of power devices comprising one or several control electrodes, unwanted starting operations of the device may occur if the external control connections ending at the terminals of the cover collect parasitic signals due to high intensity currents which may follow in neighboring conductors. This is the reason why

2 the control terminals on the cover which are intended to connect the device to the control sources are advantageously of the coaxial type, which permits the use of coaxial connections which assure a shielding of the control wire.

Controls which serve to seal semiconductor devices generally have an upper metallic portion. Well known in the art are covers having a terminal which extends through the upper portion of the metallic cover and is insulated from this cover by an insulating means, said insulating means extending to or even projecting beyond the surface of the cover and having a specific thickness so as to support the voltage being applied in the control terminal which is thus insulated and the principal terminal which is welded on the cover. This arrangement does not provide for a coaxial terminal on the insulated terminal in order to assure a rapid union of the control terminal with the control source, as well as the shielding of this connection to avoid the premature starting, mentioned above.

Accordingly, an object of the present invention is to provide an improved cover for semiconductor devices which does not have the drawbacks and shortcomings indicated hereinabove.

Another object of the present invention is to provide an improved cover for semiconductor devices which provides means for enclosing, in a vacuum-tight fashion, a semiconductor device including a principal electrode and at least one auxiliary electrode.

A further object of the present invention is to provide a vacuum tight cover for a semiconductor device wherein said cover is provided with coaxial type control terminals which assure a rapid union of the control terminal with the control source, as well as the shielding of this connection to avoid premature starting of the device.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

*Summary of the invention*

According to the present invention, an improved cover for semiconductor devices has been developed which comprises lateral insulating walls which are brazed to a base member by means of a metallic flange or collar. The lateral insulating walls are closed and brazed at their top with a metallic lid containing a noninsulated terminal which is intended to be connected to a principal electrode of the semiconductor device, and at least one insulated cross terminal intended to be connected to another electrode of the semiconductor device.

According to the present invention, each insulated cross terminal is composed of a recessed section comprising substantially vertical members which extend into the cover and provide a kind of metallic funnel which is open at both ends and defines an orifice in the lid of the cover. An insulating stopper or plug is disposed in a vacuum tight manner inside and at the lower end of the recessed section. Through this insulating stopper or plug extends a metallic tube which is brazed to said plug in a vacuum tight manner, said metallic tube receiving a connecting wire originating from the corresponding electrode of the semiconductor device.

The metallic funnel of the cross terminal may be made integral with the lid of the cover, for example, by stamping or machining, or may be attached to that lid, and in that case, is welded or brazed tightly around the corresponding opening of the aforementioned cover.

The metallic tube which extends through the insulating stopper or plug, may be open at the two extremities thereof, in which case the wire or other connection originating from the corresponding electrode of the semiconductor device is introduced into this tube and extends therethrough. It is then welded tightly to the upper extremity of the tube, which may be done either before or after the cover has been brazed on the base of the semiconductor device.

The tube may also be subdivided into two channels by means of a vacuum tight transverse partition. In this case, it has a longitudinal cross section in the form of an H. The wire originating from the semiconductor device is introduced into the lower channel and is seated there. If it is desired that the latter operation be carried out from outside of the cover and after the latter has been brazed onto the base, it is apparent that the partition which separates the tube into two channels be situated above the level of the insulating stopper or plug through which the tube extends, so that access may be had to the lower channel or duct of the metallic tube.

It is often advantageous to arrange above the funnel of either one or several cross terminals a plug of the coaxial type. The peripheral metallic wall of this plug is welded to the lid of the cover around the funnel, but in contrast to known devices, it is by no means necessary that this weld be tight since the complete tightness of the cover is achieved already at the level of the cross terminal. The wire or the connecting having extended through the metallic tube of this cross terminal or a different wire coming from the upper channel of this tube, if the latter includes a transverse partition, is inserted into the axial channel of the coaxial plug and is seated thereinto.

*Brief description of the drawings*

The present invention will become fully understood from the detailed description given hereinbelow and the accompanying drawings wherein a cover, according to the present invention, is provided with means to receive a solid thyraton, or thyristor comprising a principal electrode and a control electrode. These drawings are given by way of illustration only, and thus are not to be considered as limitive of the present invention.

*Description of the preferred embodiments*

Figure 2:
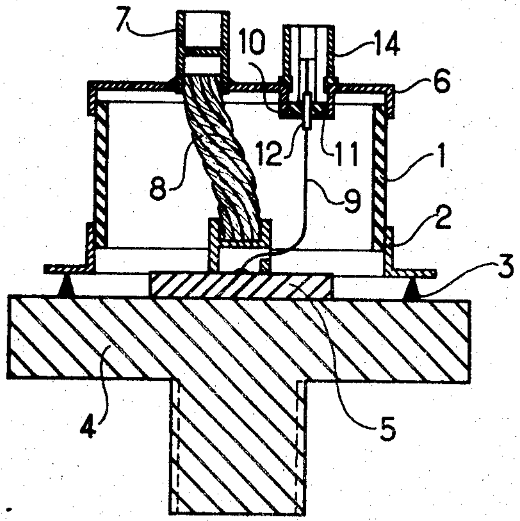
FIGURE 2 illustrates the cover of the present invention in combination with a thyristor.

According to the present invention, reference numeral 1 designates the lateral wall of the cover which, for example, may be cylindrical. The wall is composed of a suitable insulating substance, such as for example, alumina. Brazed onto the lower part of this wall is a metallic flange or collar 2 which is in turn welded to a ring 3 of the base 4 of the thyristor 5. A metallic lid 6 is brazed onto the upper portion of this wall. A metallic terminal 7 having a longitudinal cross-section in the form of an H and being disposed to receive a connection 8 coming from the principal electrode of the thyristor 5 (FIGURE 2), is welded directly to the lid 6 around an opening therein, provided for connection 8.

Figure 1:
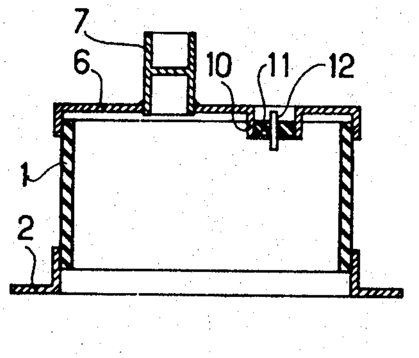
FIGURE 1 is a longitudinal cross-sectional view of the cover for semiconductor devices according to the present invention.
Figure 3:
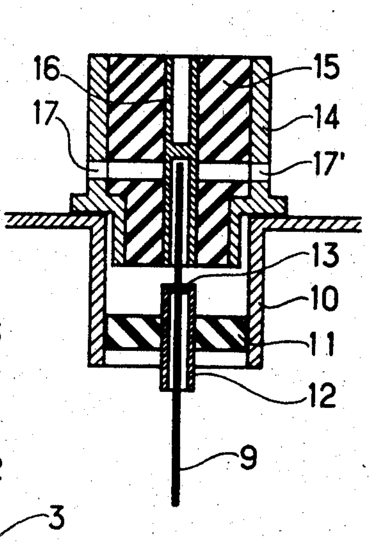
FIGURE 3 is a partially enlarged, cross-sectional view showing a mounting of a coaxial plug on the cover of the present invention.

A cross terminal for a connecting wire 9, originating from the control electrode of the thyristor, is provided which is composed of an internal funnel 10 which extends into the cover and which can be obtained by stamping the lid 6. Brazed into the bottom of this funnel is a tight insulating stopper or plug 11 through which extends, in an air tight fashion, a metallic tube 12 which receives the connecting wire 9 which is then welded at 13 (FIGURE 3) to the outlet of the tube. Thus, complete vacuum tightness of the cover is thereby accomplished.

Above the cross terminal there may be disposed a coaxial plug composed of a peripheral metallic wall 14 which is welded to the lid of the cover above the orifice of the funnel. This plug, which does not necessarily have to be vacuum tight, comprises an insulating portion 15 provided with a metallic axial channel 16 into which the end of the wire 9 which extends beyond the tube 12, is located. This wire is then seated into the channel by means of a tool which can be introduced into lateral openings 17 and 17' provided for this purpose, in the wall 14 and the insulator 15 of the coaxial plug.

Since modifications of this invention will be apparent to those skilled in the art, it is not desired to limit the invention to the exact constitution shown and described. Accordingly, all suitable modifications and equivalents may be resorted to which fall within the scope of the appended claims.

I claim:

1. A semiconductor device secured to a base and enclosed within a cover comprising insulating lateral walls fixed to said base by metallic flanges, said walls provided with a metallic lid which provides a closure for said cover, said lid containing an insulated cross terminal intended to be connected to an electrode of the semiconductor device, said terminal being composed of a recess integral with the lid and having metallic walls which define an opening which extends into said lid, an insulating plug disposed in a vacuum tight manner inside said recess and in the lower portion thereof, said plug containing a metallic tube which extends through the plug in a vacuum tight relationship, said metallic tube receiving a connecting wire from an electrode of the semiconductor device, said connecting wire extending through the metallic tube, and secured to the upper portion of said tube in a vacuum tight manner, said cover further containing a current terminal means comprising a metallic cylindrical element containing an axial internal metallic channel which is insulated from said metallic cylindrical element by insulating means, said element being secured to the lid of the cover and extending for a distance into said recess provided in the cover such that the connecting wire which extends through the metallic tube of the cross terminal also extends into the axial channel of the current terminal where it is secured by seating with the walls of said channel.

2. The semiconductor device of claim 1, wherein the recess of the cross terminal in the cover is formed as part of the lid of the cover.

3. The semiconductor device of claim 1, wherein the recess of the cross terminal in the cover is brazed to the lid in a vacuum tight manner.

4. The semiconductor device of claim 1, wherein the connecting wire extending into the metallic tube is secured therein in a vacuum tight manner.

5. The semiconductor device of claim 1, wherein the axial channel is divided into two channels by a vacuum tight transverse partition means positioned above the level of the lid, said connecting wire being seated in the lower of said two channels.

6. The apparatus of claim 1, wherein the current terminal means is provided with lateral openings which extend through the wall of the metallic cylindrical elements and through the insulating means to the axial metallic channel.

7. The semiconductor device of claim 1, wherein the cover also contains a noninsulated terminal.

8. The semiconductor device of claim 1, wherein the walls of the cover are alumina.

(References on following page)

References Cited

UNITED STATES PATENTS 3,361,943 1/1968 Knott et al.

FOREIGN PATENTS 644,596 7/1962 Canada.

OTHER REFERENCES

Netherlands application No. 241,941, Jan. 27, 1964, Siemans-Schukertwerke (Cl. 317–234.4), pp. 1–8 of spec.; inventor, Van Gennip.

LEWIS H. MYERS, *Primary Examiner.*

D. A. TONE, *Assistant Examiner.*

U.S. Cl. X.R.

174—50.6, 50.52; 317—234